(United States Patent Office)

3,456,048
Patented July 15, 1969

3,456,048
METHOD OF PROCESSING FERROELECTRIC POWDERS
Ronald J. Brandmayr, Neptune, N.J., assignor to the United States of America as represented by the Secretary of the Army
No Drawing. Filed Sept. 30, 1966, Ser. No. 584,069
Int. Cl. B28b *3/00;* B30b *11/32*
U.S. Cl. 264—89                                    3 Claims

ABSTRACT OF THE DISCLOSURE

Ferroelectric powders of fine particle size are processed using very high or super-pressures and low temperatures.

---

This invention relates in general to fine particle size ferroelectric powders and to their method of processing.

The technology of processing fine particle size ferroelectric powders has been of continuing interest due to the recognized possibility of fabricating these powders into a great variety of ceremaic materials having a broad range of properties and applications. For example, interest has been shown in the use of barium titanate as a capacitor dielectric and as a low loss dielectric resonator material for use in the microwave region.

Heretofore, ferroelectric powders such as barium titanate powder have been processed by the so-called "hot-press" technique involving the simultaneous application of heat and pressure to a sample of powder that has been previously calcined and then cold pressed. Hot-press techniques have generally involved temperatures in the range 800° C. to 1260° C. and pressures in the range of 5,000 to 30,000 pounds per square inch. By using the hot-press technique, it has been possible to obtain ceramic bodies of nearly theoretical density. The hot-press method however has certain limitations, to wit, a tendency at the temperature involved to grain growth in the sample and undesirable interactions between ingredients. Furthermore, although the ferroelectric ceramic bodies produced by the hot-press method exhibit a high degree of temperature stability of dielectric constant, when compared to their conventionally fired counterparts (in the temperature range —56 to +140° C.), they still exhibit undesirable temperature variations.

The general object of this invention is to provide a method of processing fine particle size ferroelectric powders. A more specific object of this invention is to provide a method of processing such powders at temperatures sufficiently low enough to lessen the tendency to grain growth and undesirable interactions between ingredients while at the same time obtaining a ferroelectric ceramic body approaching theoretical density. A further object of this invention is to provide a method of processing ferroelectric powders in such a manner that a densified ceramic body is obtained that can be easily removed from a die after pressing without cracking and wherein the body exhibits a high degree of temperature stability of dielectric constant.

It has been found that the aforementioned objectives can be obtained by a method involving the use of very high or super-pressures and low temperatures. According to the method of the invention, the ferroelectric powder is first calcined at a sufficiently low temperature to expel volatile matter without grain growth. The calcined powder is then cold pressed at a pressure of about 5,000 pounds per square inch to about 15,000 pounds per square inch as is well known to the art. A cold press pressure of about 10,000 pounds per square inch is preferred. Then, the cold pressed powder is hydrostatically pressed at a still greater pressure of about 50,000 pounds per square inch to about 125,000 pounds per square inch as is also known to the art. A hydrostatic press pressure of about 100,000 pounds per square inch is preferred. The hydrostatically pressed powder is then super-pressed at an even greater pressure of about 150,000 pounds per square inch to about 1,000,000 pounds per square inch and simultaneously heated at a temperature in the range of 125° C. to 720° C. A super-press pressure of about 750,000 pounds per square inch is preferred.

The calcination step is carried out conventionally in a kiln or oven at a temperature in the range of 100° C. to 1000°C. The calcined powder is then cold pressed by conventional means such as in a steel die at room temperature. The cold pressed powder is then hydrostatically pressed by conventional means.

Thereafter the hydrostatically pressed powder is super-pressed in a suitable press such as a hexahedral or tetrahedral press. One such press that has been found very suitable is a two thousand ton hexahedral multi-anvil unit with tungsten carbide anvils. As the pressure transmitting medium, this type press utilizes lava which has been machined into a block with preformed gaskets.

In the super-pressing step according to the invention, the hydrostatically pressed ferroelectric powder is wrapped in 1 mil thick platinum foil and conveniently inserted in the sample holder assembly of the above described press. The assembly consists of a stainless steel heater with a boron nitride lining, brass ring inserts at both ends of the tubular heater, and lava end plugs which set into the brass rings. Power is supplied to the heater through the brass rings which make electrical contact with two pistons of the press. The boron nitride liner serves as a release agent for the compressed sample and also contributes to decreasing the tendency toward cracking of the sample.

When a high purity ultra fine (0.05 to 0.1 micron) grained ferroelectric powder such as barium titanate powder is processed according to the above described method, dense ceramic bodies result that show a high degree of temperature stability of dielectric constant due to complete suppression of the Curie temperature. That is, the dielectric constant of the barium titanate body does not vary more than 10 percent from the room temperature value in the temperature range from 25° C. to 150° C. This compares to a hot press body which has a variation of 40 percent from the room temperature (25° C.) value over the same temperature range. The barium titanate samples are easily removable from the super-press die without cracking and are further found to have an 0.05 micron uniform microstructure. Densities are obtained in the processed barium titanate body of 94 to 98 percent of the theoretical density. The dielectric constants of the super-pressed barium titanate range from 200 to 1400.

The foregoing is to be considered as illustrative of the invention and not in limitation thereof.

What is claimed is:

1. A method of processing fine particle size barium titanate powders in such a manner as to achieve densified bodies of ultrafine grain size and exhibiting a high degree of temperature stability of dielectric constant due to complete suppression of the Curie temperature, said method including the steps of:

(A) calcining the barium titanate powder at 100° C. to 1000° C. to expel volatile matter without grain growth, (B) cold pressing the calcined powder at a pressure ranging from about 5,000 to about 15,000 pounds per square inch, (C) hydrostatically pressing the cold pressed powder at a pressure greater than the pressure of step (B), and ranging from about 50,000 to about 125,000 pounds per square inch, and (D) super-pressing the hydrostatically pressed powder at a pressure greater than the pressure of step (C) and ranging from about 150,000 to about 1,000,000 pounds per square inch and simultaneously heating the hydrostatically pressed powder at a temperature in the range of 125° C. to 720° C.

2. The method according to claim 1 wherein the cold pressure is about 10,000 pounds per square inch, the hydrostatic press pressure is about 100,000 pounds per square inch, and the super-press pressure is about 750,000 pounds per square inch.

3. The method according to claim 1 wherein the hydrostatically pressed barium titanate powder is simultaneously super-pressed and heated while wrapped in platinum foil inserted inside a tubular stainless steel heater with a boron nitride lining.

References Cited

UNITED STATES PATENTS

| | | | |
|---|---|---|---|
| 2,956,327 | 10/1960 | Borel et al. | 264—65 |
| 2,985,939 | 5/1961 | Brockman | 264—61 |
| 3,000,071 | 9/1961 | Wehrmann | 264—65 |
| 3,049,431 | 8/1962 | Russell | 264—61 |
| 3,383,737 | 5/1968 | Greger | 264—65 |

DONALD J. ARNOLD, Primary Examiner

U.S. Cl. X.R.

106—39; 252—62.51, 63.5; 264—65, 66